United States Patent
Auclair et al.

(10) Patent No.: US 9,734,594 B2
(45) Date of Patent: Aug. 15, 2017

(54) PRODUCING THREE-DIMENSIONAL REPRESENTATION BASED ON IMAGES OF AN OBJECT

(71) Applicant: Electronic Arts Inc., Redwood City, CA (US)

(72) Inventors: David Auclair, Orlando, FL (US); Gianvito Serra, Austin, TX (US); Caleb Howard, West Vancouver (CA); Robert Jay Reynolds, Vancouver (CA); Gerald Phaneuf, Seattle, WA (US); Aaron Jeromin, Seattle, WA (US); Michael Frederick Polak, Elora (CA); Jerome Timothy Bradley, Orlando, FL (US); Edmond Lo, New Westminster (CA); Thomas Ince, Orlando, FL (US); Ray Shannon, Vancouver (CA); Timothy King, Orlando, FL (US)

(73) Assignee: Electronics Arts Inc., Redwood City, CA (US)

( * ) Notice: Subject to any disclaimer, the term of this patent is extended or adjusted under 35 U.S.C. 154(b) by 111 days.

(21) Appl. No.: 14/965,481

(22) Filed: Dec. 10, 2015

(65) Prior Publication Data

US 2017/0061685 A1    Mar. 2, 2017

Related U.S. Application Data

(63) Continuation-in-part of application No. 14/836,299, filed on Aug. 26, 2015.

(51) Int. Cl.
*G06T 17/20* (2006.01)
*G06T 7/73* (2017.01)
(Continued)

(52) U.S. Cl.
CPC ............ *G06T 7/75* (2017.01); *A63F 13/00* (2013.01); *G06T 1/20* (2013.01); *G06T 17/20* (2013.01); *H04N 21/00* (2013.01); *H04N 13/026* (2013.01)

(58) Field of Classification Search
None
See application file for complete search history.

(56) References Cited

U.S. PATENT DOCUMENTS

2009/0310828 A1* 12/2009 Kakadiaris ......... G06K 9/00208
                                                                    382/118
2016/0350618 A1    12/2016 Meekins et al.

OTHER PUBLICATIONS

Pighin, Frédéric, et al. "Synthesizing realistic facial expressions from photographs." ACM SIGGRAPH 2006 Courses. ACM, 2006.*

* cited by examiner

*Primary Examiner* — Vu Nguyen
(74) *Attorney, Agent, or Firm* — Lowenstein Sandler LLP

(57) ABSTRACT

An example method of generating three-dimensional objects based on two-dimensional images of at least part of the object may include receiving a rendering transaction request. The method may further include transmitting, to the requestor, a rendering transaction response identifying a first storage location. The method may further include receiving, from the requestor, a notification indicating that images depicting an object have been uploaded to the first storage location. The method may further include transmitting, to a rendering application, a rendering request. The method may further include receiving, from the rendering application, a rendering response indicating that a polygonal mesh representing the images has been stored at a second storage location. The method may further include producing, using the polygonal mesh, a preview image and storing the preview image at a third storage location. The method may (Continued)

further include transmitting, to the requestor, a notification of completion of the rendering transaction.

15 Claims, 18 Drawing Sheets

(51) Int. Cl.
*A63F 13/00* (2014.01)
*G06T 1/20* (2006.01)
*H04N 21/00* (2011.01)
*H04N 13/02* (2006.01)

3D scene 530
510

Scan model 520

PRODUCING THREE-DIMENSIONAL REPRESENTATION BASED ON IMAGES OF AN OBJECT

CROSS-REFERENCE TO RELATED APPLICATIONS

This application is a continuation-in-part of prior application Ser. No. 14/836,299, filed Aug. 26, 2015, the entire content of which is incorporated by reference herein.

TECHNICAL FIELD

The present disclosure is generally related to producing computer-generated imagery, and is more specifically related to producing three-dimensional representation based on images of an object (e.g., a human body).

BACKGROUND

In computer-generated visual content (such as interactive video games), human bodies may be represented by various computer-generated objects, including polygonal meshes and textures. A polygonal mesh herein shall refer to a collection of vertices, edges, and faces that define the shape and/or boundaries of a three-dimensional object. An edge is a line connecting two vertices. A vertex is a point having a certain spatial position. Mesh faces may be provided by various polygonal shapes such as triangles, quads (quadrangles), and/or other regular or irregular polygons. A texture herein shall refer to a projection of an image onto a surface (such as a surface represented by a polygonal mesh).

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
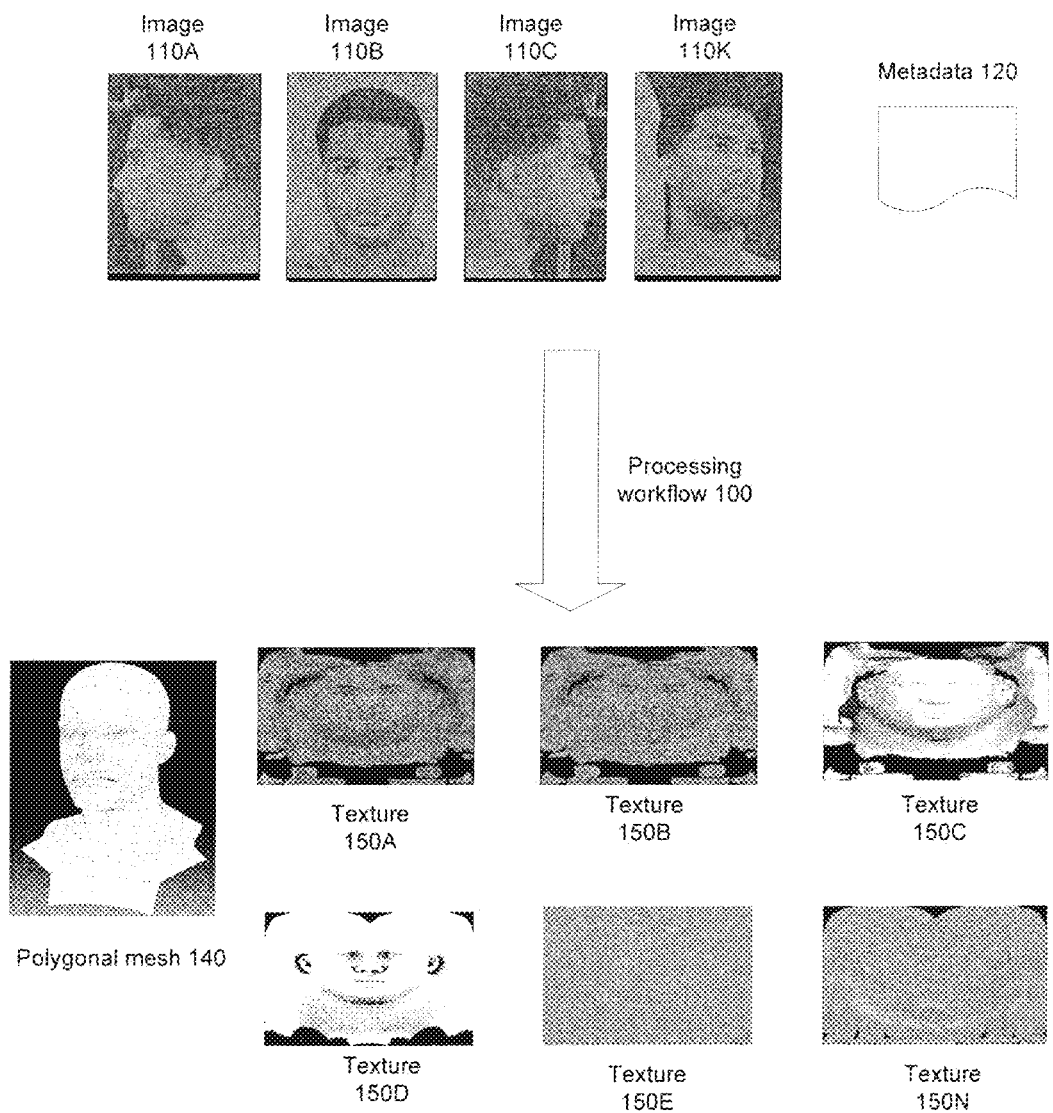
FIG. 1 schematically illustrates input and output files and parameters of a processing workflow operating in accordance with one or more aspects of the present disclosure.

Described herein are methods and systems for generating three-dimensional visual objects representing an object based on two-dimensional images of at least a part of the object. In various illustrative examples, the methods and systems may be employed for generating three-dimensional visual objects representing a person based on two-dimensional images of at least a part of the person's body (e.g., the person's head).

Such methods and systems may be utilized, for example, in various interactive video game applications for generating three-dimensional visual objects representing a game character having a visual resemblance with a certain person (e.g., a celebrity, or a user of an interactive video game). Example processing workflows operating in accordance with one or more aspect of the present disclosure may acquire a series of images of a person's head and produce application resolution and level of detail (LOD) resolution polygonal meshes and textures, as described in more details herein below. LOD herein refers to a simplified version of the original model that may be employed to simulate views at the modeled object from various distances.

In an illustrative example, a user of an interactive video game may employ a video camera-equipped portable computing device (such as a smartphone) to acquire a series of images showing his or her head from various positions. In another illustrative example, the series of images may be acquired using one or more general purpose or specialized still image cameras, which may be positioned around a stationary object (such as a person's head) and may optionally be equipped with synchronized light sources and autofocusing lenses designed to produce high-quality images.

The acquired images may be pre-processed (e.g., by an application being executed by the portable computing device), to produce a polygonal mesh representing a rough scan model of the user's head (referred herein as "scan model"). The processing workflow may then upload the acquired images, the scan model, and metadata associated with the acquired images to one or more servers represented by general purpose or specialized computer systems. The scan model may be transformed to align with a base polygonal mesh, which is compliant with the target application topology, as described in more details herein below. Certain anatomical features (e.g., nose, eyes, lips, etc.) may be detected in the original images and projected onto the scan model using the metadata describing the camera position for each image. The base polygonal mesh may then be transformed to align with the scan model, by minimizing the differences in curvatures, point positions, and point normal orientations (e.g., using the iterative closest point and/or simulated annealing optimization methods). The resulting polygonal mesh may than be further processed (e.g., to smooth the geometry, fit the eye balls, etc.). Various textures, such as a light map, shaded color, color, normal, half bent normal, and occlusion textures, for the target application-resolution model and UV space layout may then be generated using the original images and the base polygonal mesh. UV space herein refers to a two-dimensional space that may be employed to represent a texture map of a three-dimensional object, where the letters U and V denote the axes of such space. The processing workflow may then output the application resolution and level of detail (LOD) resolution polygonal meshes and textures.

In certain implementations, the objects produced by the above described processing workflow may be edited by an artist in order to improve certain visual aspects of these objects. Alternatively, the objects produced by the above described processing workflow may be employed in a target application (e.g., interactive video game) without additional processing.

Various aspects of the above referenced methods and systems are described in details herein below by way of examples, rather than by way of limitation.

As schematically illustrated by FIG. 1, an example processing workflow 100 operating in accordance with one or more aspects of the present disclosure receives a series of images 110A-110K showing the head of a person from various positions and certain metadata 120 associated with the images. Based on these inputs, the example processing workflow outputs various visual objects that may be employed for producing three-dimensional computer-generated imagery representing, in a certain target application (such as an interactive video game) a character having a visual resemblance with that person. These visual objects may include a target application topology-compliant polygonal mesh 140 representing the head of the person, and may further include various textures 150A-150N, such as a light map, shaded color, color, normal, half bent normal, and occlusion textures, for the target application-resolution model. In various implementations, example processing workflow may be provided by a workflow comprising any combination of elements from example processing workflows 200 and/or 1200 that are described herein below with references to FIGS. 2 and 12.

Figure 2:
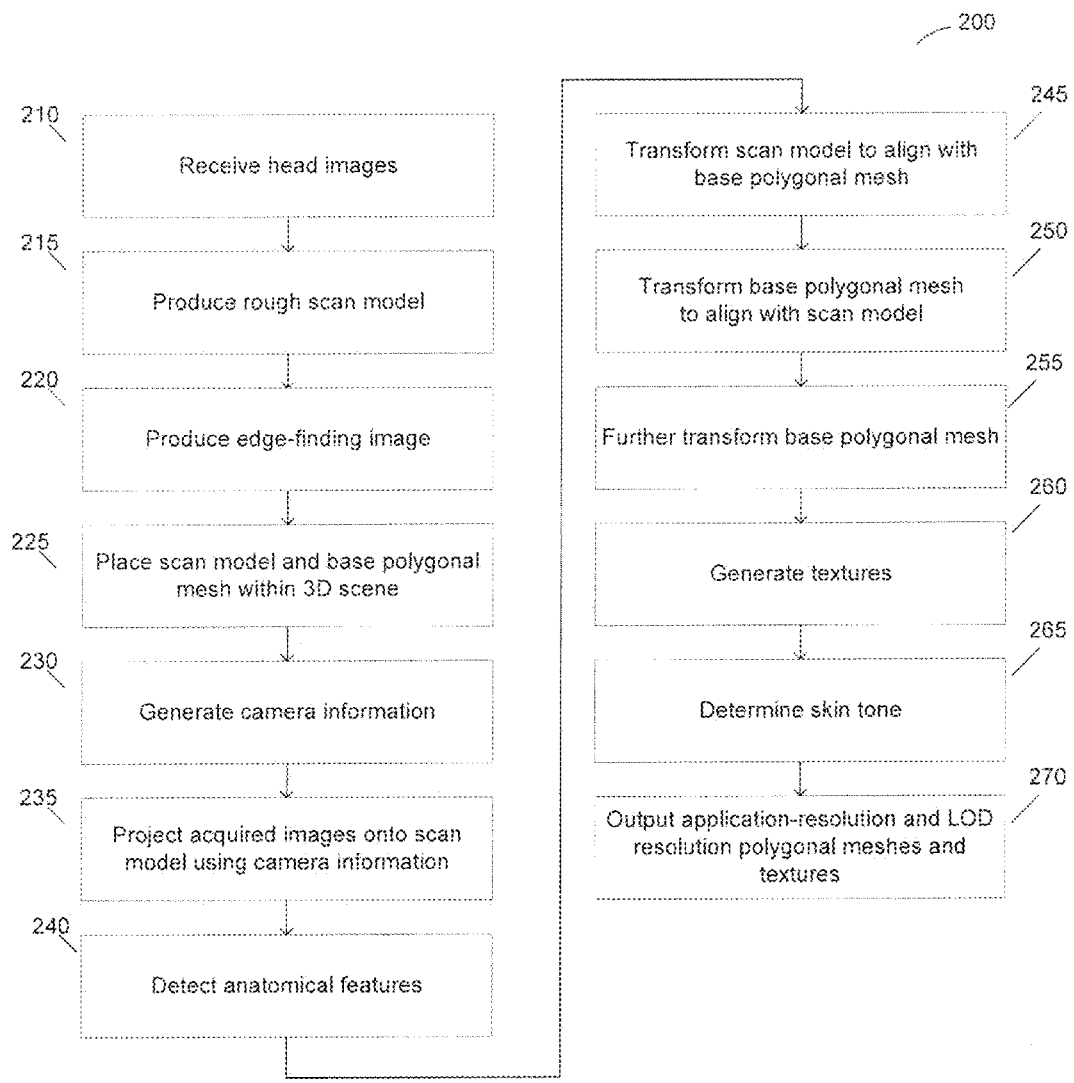
FIG. 2 schematically illustrates a flow diagram of an example fully-automated processing workflow for generating three-dimensional visual objects representing a person based on two-dimensional images of at least a part of the person's body, in accordance with one or more aspects of the present disclosure.

FIG. 2 depicts a flow diagram of an example fully-automated processing workflow 200 for generating three-dimensional visual objects representing a person based on two-dimensional images of at least a part of the person's body, in accordance with one or more aspects of the present disclosure. Processing workflow 200 may be employed for producing visual objects representing a game character having a visual resemblance with a certain person (e.g., a user of an interactive of video game). The visual objects produced by processing workflow 200 may be directly (i.e., without any further processing) used by the target application (such as an interactive video game).

Processing workflow 200 and/or each of its individual functions, routines, subroutines, or operations may be performed by one or more general purpose and/or specialized processing devices. In certain implementations, certain operations of processing workflow 200 may be performed by a mobile computing device, while other operations may be performed by one or more general purpose computer systems (also referred herein as servers), such as computing device 1800, which is described herein below with references to FIG. 18.

Two or more functions, routines, subroutines, or operations of processing workflow 200 may be performed in parallel or in an order which may differ from the order described above. In certain implementations, processing workflow 200 may be implemented by a single processing thread. Alternatively, processing workflow 200 may be implemented by two or more processing threads, each thread executing one or more individual functions, routines, subroutines, or operations of the method. In an illustrative example, the processing threads implementing processing workflow 200 may be synchronized (e.g., using semaphores, critical sections, and/or other thread synchronization mechanisms). Alternatively, the processing threads implementing processing workflow 200 may be executed asynchronously with respect to each other.

At block 210, the processing workflow may receive a series of images showing a head of a person from various positions. In certain implementations, a user of an interactive video game may employ a video camera-equipped portable computing device (such as a smartphone) to acquire such images. In an illustrative example, a smartphone may be programmed to acquire a series of images with a certain frequency while the stationary smartphone camera is focused on the user's head, which the user is instructed to slowly rotate. In certain implementations, the series of images may be accompanied by the associated metadata such as the camera position relative to the object and/or camera settings, such as the ISO number, focal length, aperture, and/or shutter speed.

Figure 3:
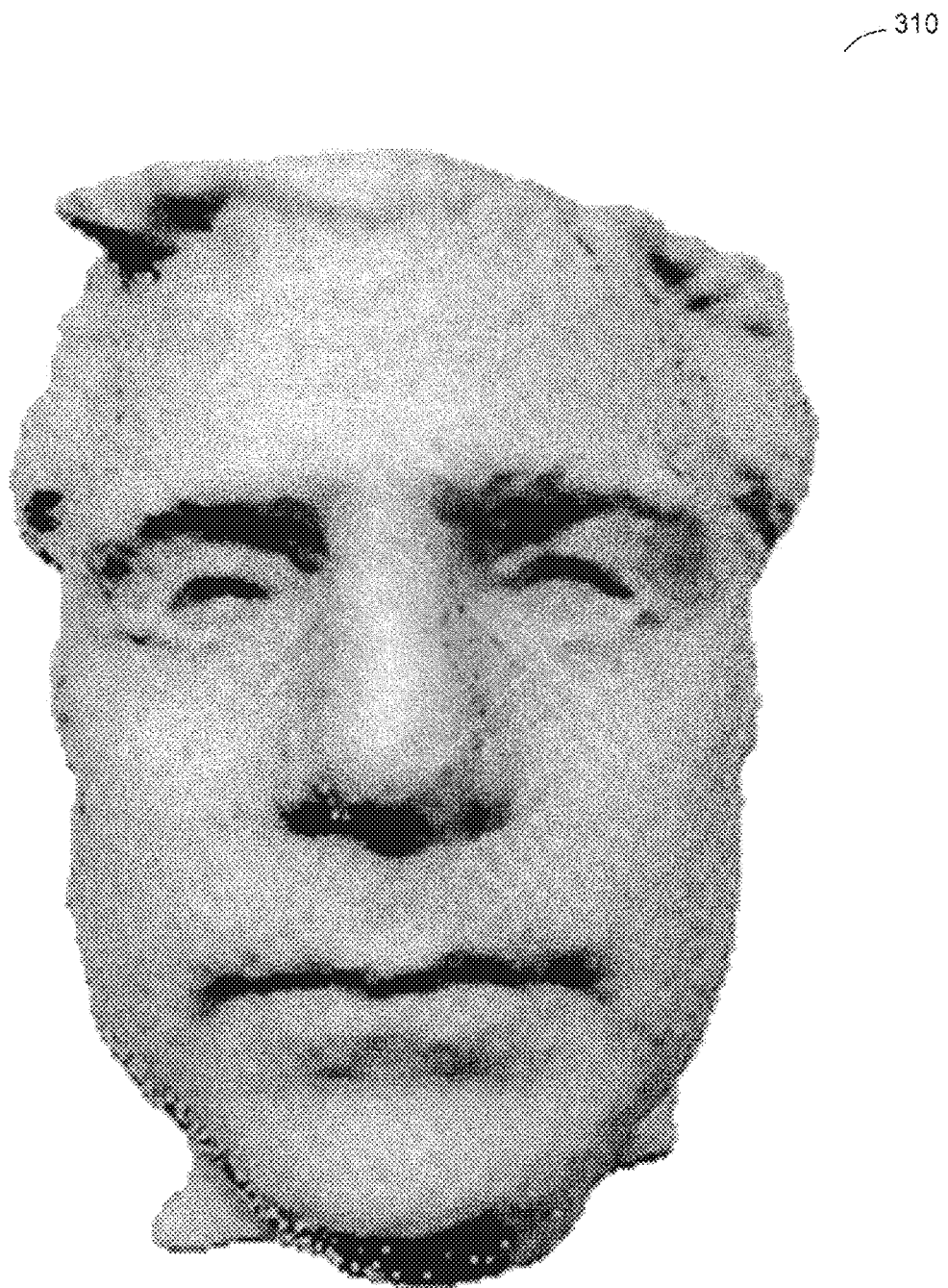
FIG. 3 schematically illustrates a polygonal mesh representing a rough scan model of a head, in accordance with one or more aspects of the present disclosure.

At block 215, the processing workflow may process the acquired images to produce a polygonal mesh representing a rough scan model of the user's head, as schematically illustrated by FIG. 3. Scan model 310 may be produced by comparing certain parameters (such as luminance or color gradients) of various areas of the modeled object in several images to yield the three-dimensional object representation. The scan model parameters may not be aligned with the target application topology, and hence the scan model may not be suitable for being directly used by the target application (such as an interactive video game).

Figure 4:
FIG. 4 schematically illustrates an example edge-finding image, in accordance with one or more aspects of the present disclosure.

At block 220, the processing workflow may produce an edge-finding image that may be derived from one or more of the original images of the person's head. An example edge-finding image 410 is schematically illustrated by FIG. 4. The process of generating the edge-finding image may analyze the luminance gradients to detect the positions of curvatures corresponding to certain anatomical feature points of the person's head (such as nose, eyes, lips, etc.).

Figure 5:
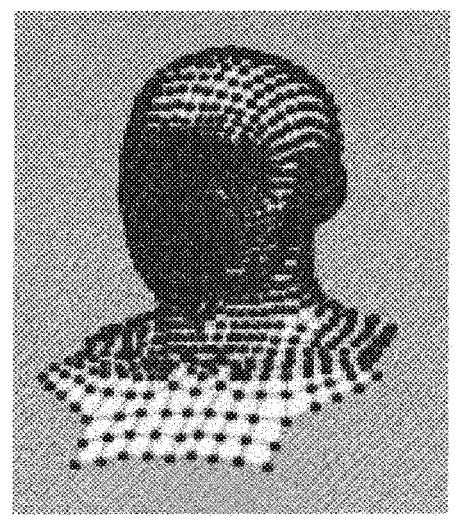
FIG. 5 schematically illustrates a scan model and a base polygonal mesh placed within the same scene in a three-dimensional space, in accordance with one or more aspects of the present disclosure.
Figure 5:

At block 225, the processing workflow may place the scan model and a base polygonal mesh within the same scene in a three-dimensional space, as schematically illustrated by FIG. 5. Base polygonal mesh 510 may be compliant with the target application topology, e.g., in the type of polygonal faces, resolution, and/or other parameters.

In an illustrative example, scan model 520 and base polygonal mesh 510 may be placed within the same three-dimensional scene 530 in a manner that minimizes the differences in the positions and orientations of certain corresponding elements of both meshes. In certain implementations, the position of scan model 520 within three-dimensional scene 530 may be determined using the edge-finding image produced by the operations described herein above with reference to block 220.

Figure 6:
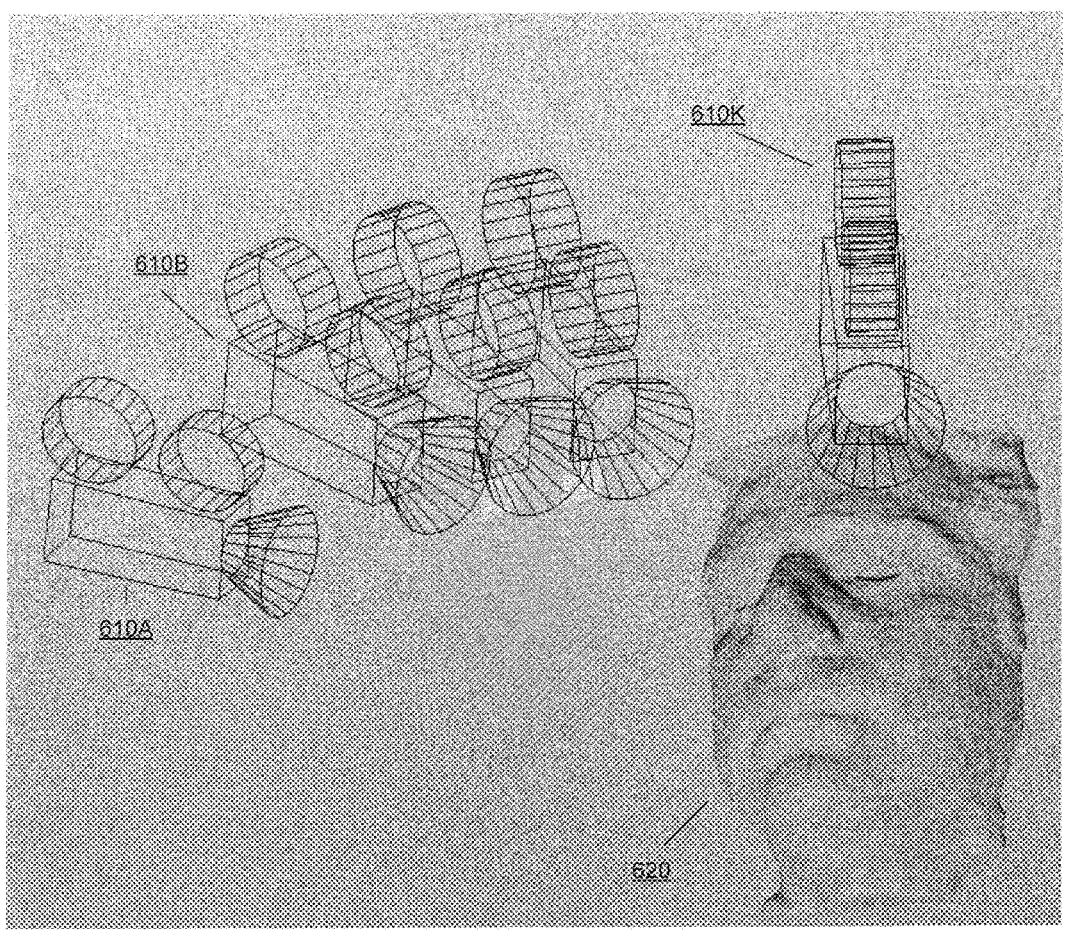
FIG. 6 schematically illustrates generating the camera information, in accordance with one or more aspects of the present disclosure.

At block 230, the processing workflow may generate the camera information, as schematically illustrated by FIG. 6. In an illustrative example, each image of the series of image may be associated with a camera 610A-610K, the position of which relative to scan model 620 may be determined using the image metadata associated with the image files. For each camera, the processing workflow may produce a transformation matrix defining the camera position relative to the object being imaged, the camera orientation, and the scale of the associated image.

Figure 7:
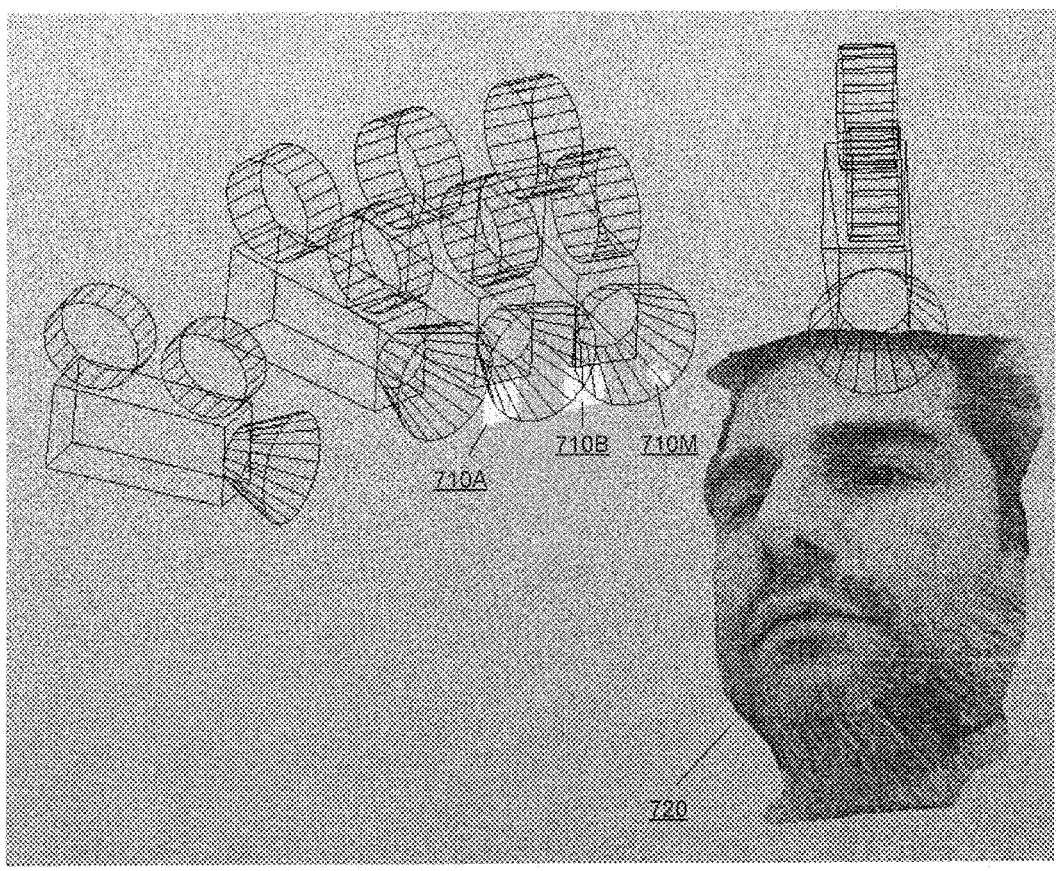
FIG. 7 schematically illustrates projecting acquired images onto the scan model, in accordance with one or more aspects of the present disclosure.

At block 235, the processing workflow may project the acquired images onto the scan model, as schematically illustrated by FIG. 7. In an illustrative example, each image 710A-710M may be projected to scan model 720 using the camera information produced by the operations described herein above with reference to block 230.

Figure 8:
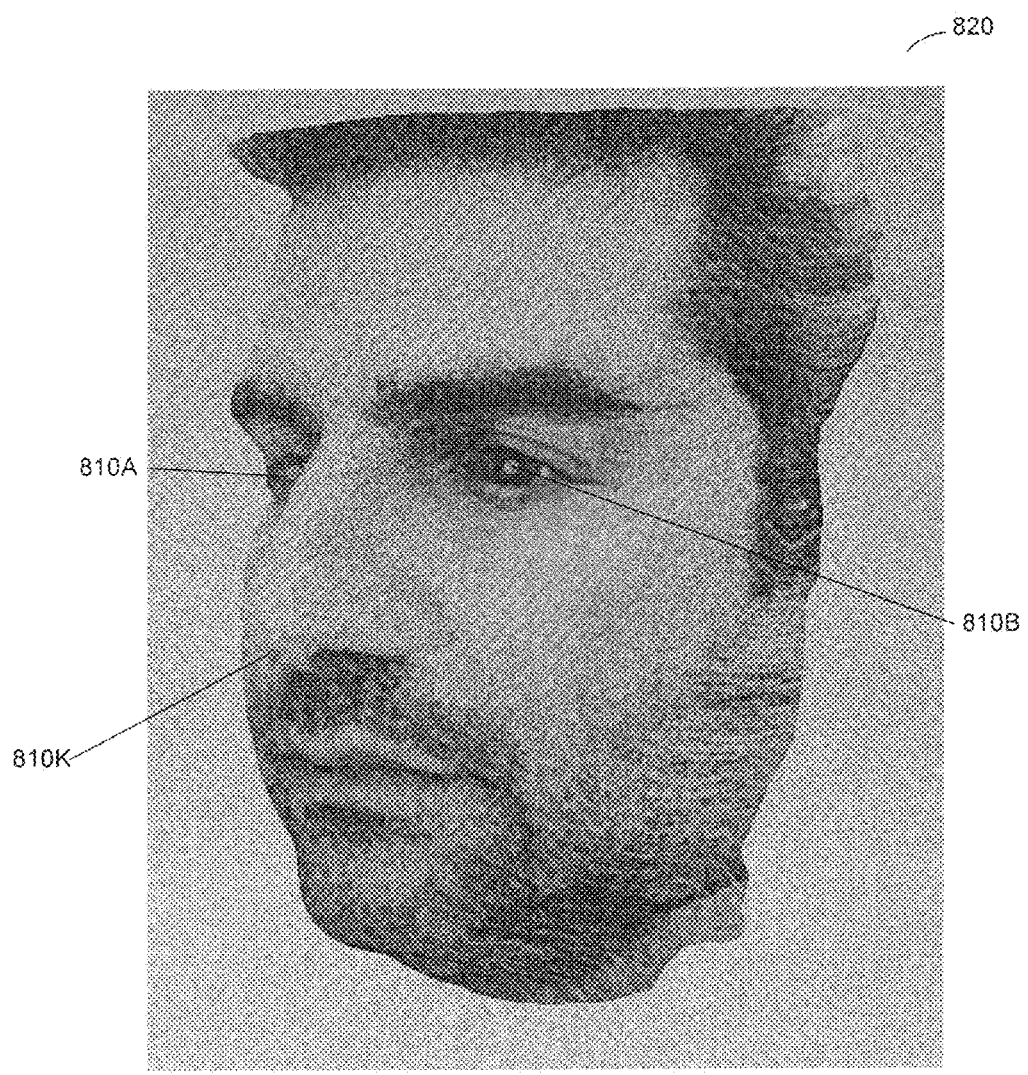
FIG. 8 schematically illustrates projecting detected anatomical features onto the scan model, in accordance with one or more aspects of the present disclosure.

At block 240, the processing workflow may detect certain anatomical features (such as nose, eye, and/or lips) within the acquired images and, using the image mapping information produced by the operations described herein above with reference to block 235, project the detected anatomical features onto the scan model, as schematically illustrated by FIG. 8. In an illustrative example, the processing workflow may determine positions 810A-810K of certain anatomical features (such as nose, eye, and/or lips) on scan model 820.

Figure 9:
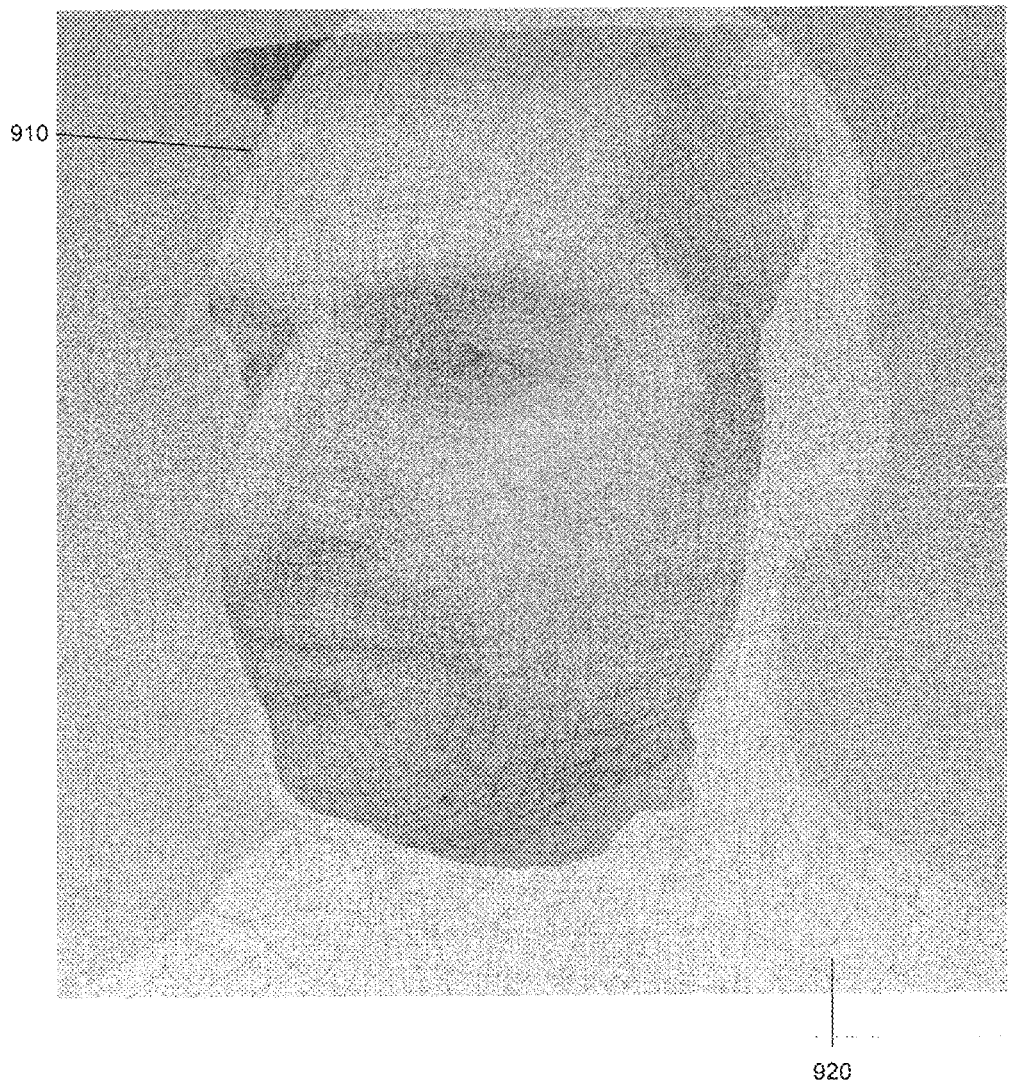
FIG. 9 schematically illustrates transforming the scan model to align with the base polygonal mesh, in accordance with one or more aspects of the present disclosure.

At block 245, the processing workflow may transform the scan model to align with the base polygonal mesh. Transforming the scan model may comprise modifying positions, orientations, and/or sizes of one or more polygonal faces of the scan model. As schematically illustrated by FIG. 9, the processing workflow may transform scan model 910 to adjust the positions and/or orientations of certain anatomical features (such as nose, eyes, and/or lips) in order to minimize the difference in positions, orientations, and/or sizes of corresponding anatomical features in scan model 910 and base polygonal mesh 920.

In certain implementations, the processing workflow may employ a heuristic optimization method (such as iterative closest point and/or simulated annealing) to transform scan model 910 to minimize the differences in curvatures, point positions, and point normal orientations with respect to base polygonal mesh 920. In an illustrative example, the iterative closest point method may be employed to produce the initial approximation of the transformed scan model, which may be used as the starting point for further optimization by the simulated annealing method.

Figure 10:
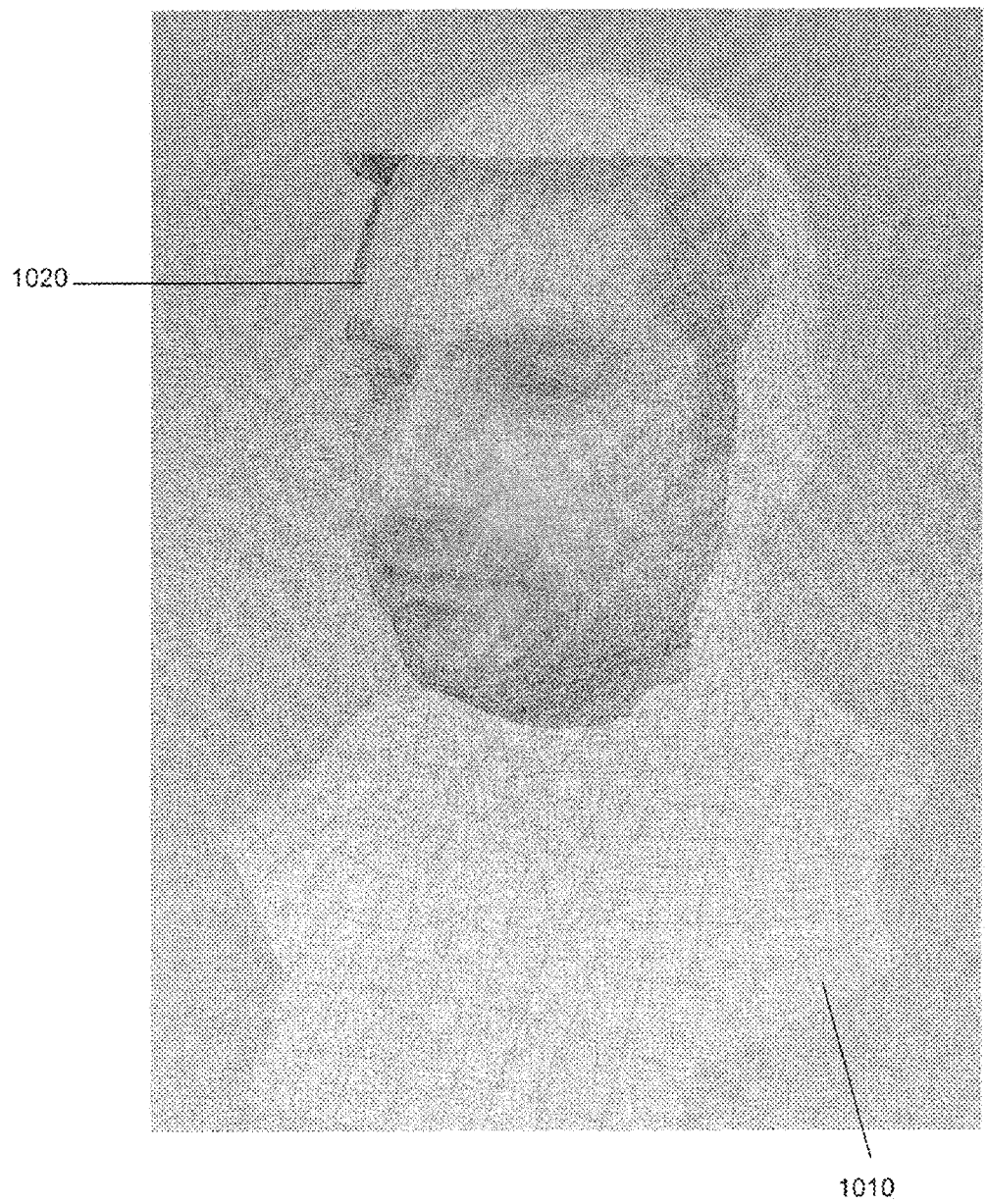
FIG. 10 schematically illustrates transform the base polygonal mesh to align it with the scan model, in accordance with one or more aspects of the present disclosure.

At block 250, the processing workflow may transform the base polygonal mesh to align it with the scan model. Transforming the base polygonal mesh may comprise modifying positions, orientations, and/or sizes of one or more polygonal faces of the base polygonal mesh. As schematically illustrated by FIG. 10, the processing workflow may transform base polygonal mesh 1510 by adjusting the positions and/or orientations of certain anatomical features (such as nose, eyes, and/or lips) in order to minimize the difference in positions, orientations, and/or sizes of corresponding anatomical features in scan model 1020 and in base polygonal mesh 1510. In certain implementations, the processing workflow may further transform the scan model by smoothing the model geometry (i.e., adjusting the curvatures of certain lines to bring the line curvature within a pre-defined range).

In certain implementations, the processing workflow may employ a heuristic optimization method (such as iterative closest point and/or simulated annealing) to transform base polygonal mesh 1510 to minimize the differences in curvatures, point positions, and point normal orientations with respect to scan model 1020. In an illustrative example, the iterative closest point method may be employed to produce the initial approximation of the transformed scan model, which may be used as the starting point for further optimization by the simulated annealing method.

At block 255, the processing workflow may further transform the base polygonal mesh, e.g., by blending certain areas of the scan model with corresponding areas of the base polygonal mesh, modifying edge loops, and merging some vertices of the scan model with corresponding vertices of the base polygonal mesh.

Figure 11:
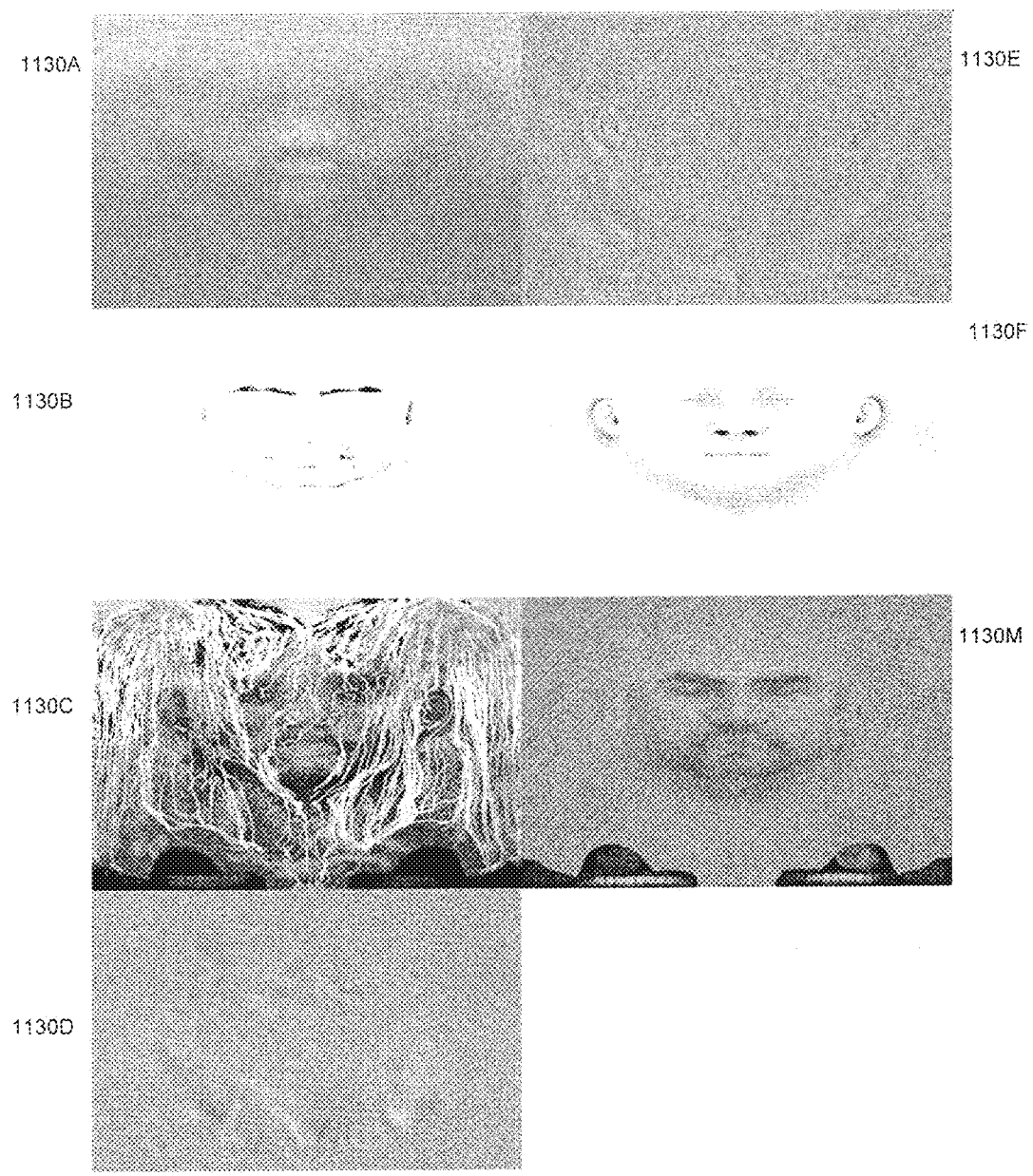
FIG. 11 schematically illustrates generating various textures for the target application-resolution model and UV layout, in accordance with one or more aspects of the present disclosure.

At block 260, the processing workflow may generate various textures, such as a light map, shaded color, color, normal, half bent normal, and occlusion textures, for the target application-resolution model and the UV layout, as schematically illustrated by FIG. 11. In an illustrative example, the processing workflow may project the images acquired by a subset of cameras (e.g., front and side cameras) onto the base polygonal mesh, and then transform the projected images into the UV space to produce one or more texture maps 1130A-1130M. For every pixel on the surface of the polygonal mesh, the processing workflow may select a corresponding pixel within an image pointed to by a normal vector associated with the pixel.

At block 265, the processing workflow may determine the skin tone to be applied to the textures. In certain implementations, the processing workflow may determine an average color of each texture image (e.g., by averaging the RGB values of all pixels of the image) and identify a generic skin tone having the average image color within a certain threshold range of the determined average image color of the texture image. The identified generic skin tone may then be applied to the textures.

At block 270, the processing workflow may output the application resolution and level of detail (LOD) resolution polygonal meshes and the color textures produced by the operations described herein above with reference to block 260.

In certain implementations, the objects produced by the above described processing workflow may be directly, without additional processing, employed in a target application (e.g., interactive video game) to produce a game character having a visual resemblance with the user of the interactive video game.

Figure 12:
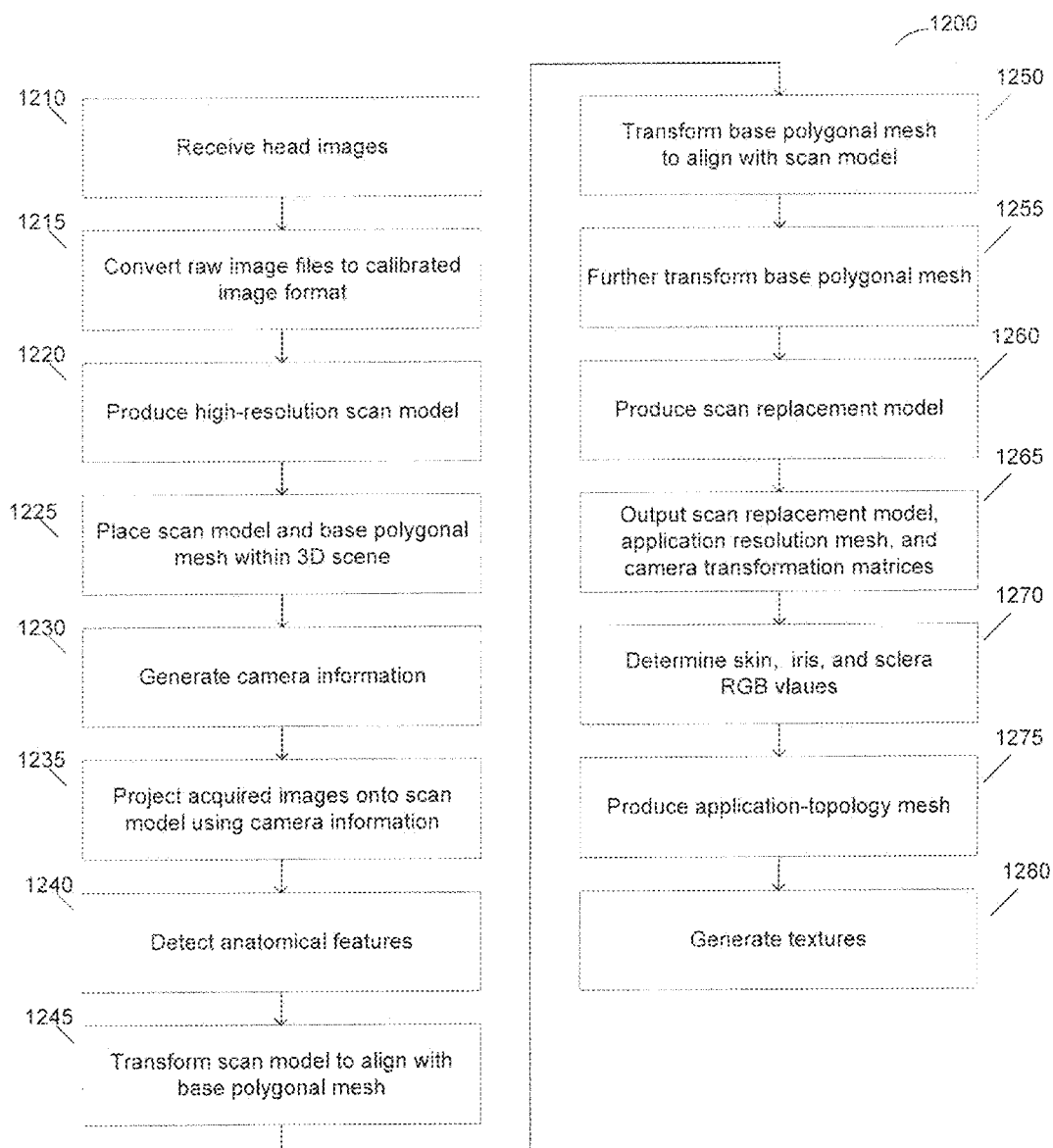
FIG. 12 schematically illustrates a flow diagram of an example artist-assisted processing workflow for generating three-dimensional visual objects representing a person based on two-dimensional images of at least a part of the person's body, in accordance with one or more aspects of the present disclosure.

FIG. 12 depicts a flow diagram of an example artist-assisted processing workflow 1200 for generating three-dimensional visual objects representing a person based on two-dimensional images of at least a part of the person's body, in accordance with one or more aspects of the present disclosure. Processing workflow 1200 may be employed for producing visual objects representing a game character having a visual resemblance with a certain person (e.g., a celebrity). The visual objects produced by processing workflow 1200 may be edited by an artist for further improving certain visual aspects of those objects.

Processing workflow 1200 and/or each of its individual functions, routines, subroutines, or operations may be performed by one or more general purpose and/or specialized processing devices. In certain implementations, certain operations of processing workflow 1200 may be performed by one or more general purpose computer systems (also referred to as servers), such as the computing device 1800, which is described herein below with references to FIG. 18.

Two or more functions, routines, subroutines, or operations of processing workflow 1200 may be performed in parallel or in an order which may differ from the order described above. In certain implementations, processing workflow 1200 may be implemented by a single processing thread. Alternatively, processing workflow 1200 may be implemented by two or more processing threads, each thread executing one or more individual functions, routines, subroutines, or operations of the method. In an illustrative example, the processing threads implementing processing workflow 1200 may be synchronized (e.g., using semaphores, critical sections, and/or other thread synchronization mechanisms). Alternatively, the processing threads implementing processing workflow 1200 may be executed asynchronously with respect to each other.

At block 1210, the processing workflow may receive a series of images showing a head of a person from various positions. In certain implementations, the series of images may be acquired using one or more general purpose or specialized still image cameras, which may be positioned around a stationary object (such as a person's head) and may optionally be equipped with synchronized light sources and/or auto-focusing lenses designed to produce high-quality images. In certain implementations, the light sources and the lenses may be cross-polarized (i.e., by placing a vertical polarization film in front of the light sources and a horizontal polarization film behind the lenses) to minimize the specular reflections.

In an illustrative example, the images received by the processing workflow may be in a raw image format. In certain implementations, the series of images may be accompanied by the associated metadata files comprising various image metadata such as the camera position relative to the object and/or camera settings, such as the ISO number, the focal length, aperture, and/or the shutter speed.

At block 1215, the processing workflow may convert the raw image files and associated metadata files to a calibrated image format, such as TIFF format. The produced TIFF files may comprise calibrated images and the associated image metadata.

Figure 13:
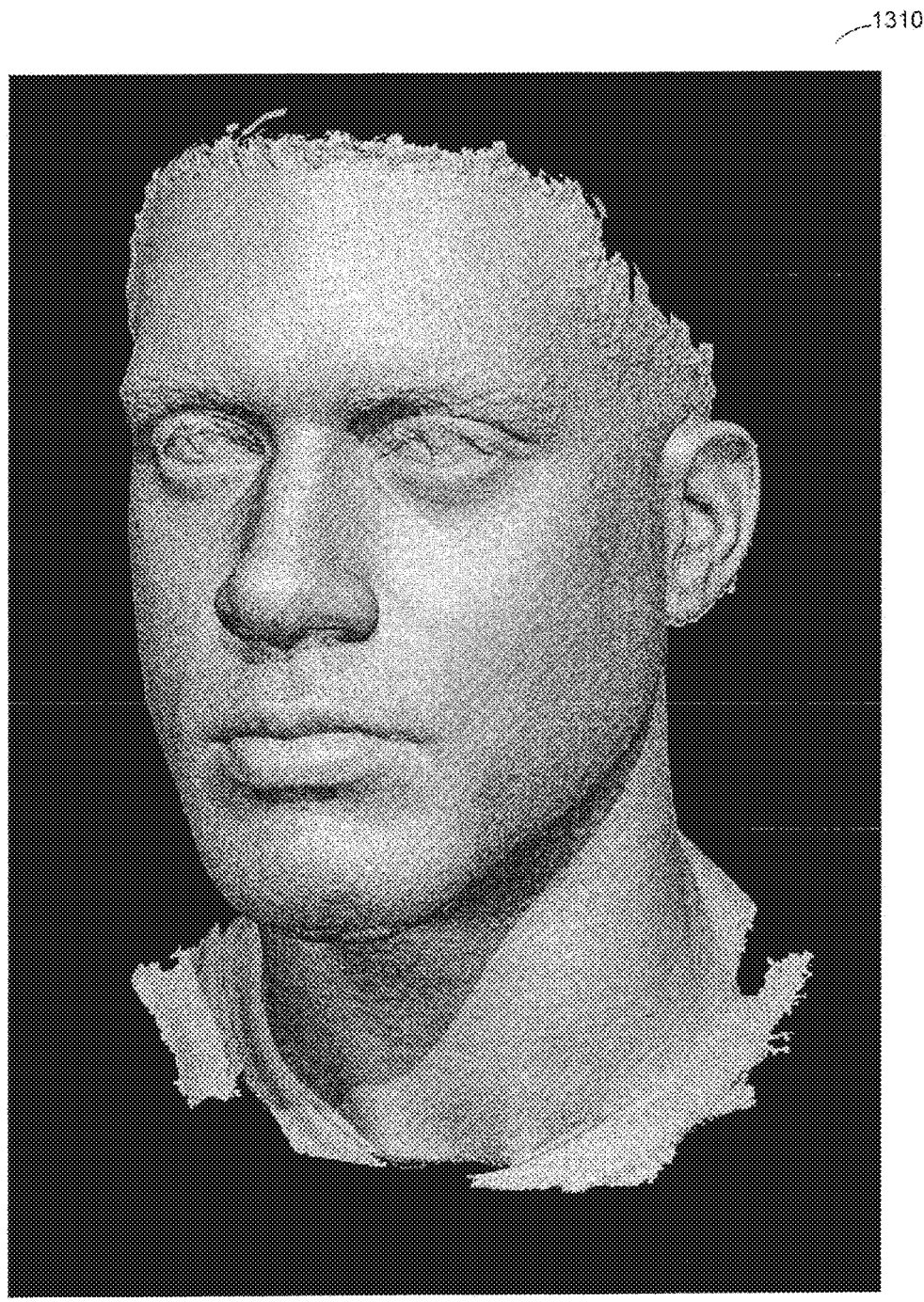
FIG. 13 schematically illustrates a polygonal mesh representing high-resolution scan model of a head, in accordance with one or more aspects of the present disclosure.

At block 1220, the processing workflow may produce a high-resolution polygonal mesh representing a scan model of the user's head (referred herein to as "scan model"), as schematically illustrated by FIG. 13. Scan model 1310 may be produced by comparing certain parameters (such as luminance or color gradients) of various areas of the modeled object in several images to yield the three-dimensional object representation. In certain implementations, blue channel images may be employed as the basis for producing the scan model, in order to minimize the scattered light noise in the images.

The scan model parameters may not be aligned with the target application topology, and hence the scan model may not be suitable for being directly used by the target application (such as an interactive video game). In certain implementations, the resolution of scan model 1310 may be significantly higher than the target application resolution.

At block 1225, the processing workflow may place the scan model and a base polygonal mesh within the same scene in a three-dimensional space, as schematically illustrated by FIG. 5. Base polygonal mesh 510 may be compliant with the target application topology, e.g., in the type of polygonal faces, resolution, and/or other parameters.

In an illustrative example, scan model 520 and base polygonal mesh 510 may be placed within the same three-dimensional scene 530 in a manner that minimizes the differences in the positions and orientations of certain corresponding elements 540A-540B of both meshes.

At block 1230, the processing workflow may generate the camera information, as schematically illustrated by FIG. 6. In an illustrative example, each image of the series of image may be associated with a camera 610A-610K, the position of which relative to scan model 620 may be determined using the image metadata associated with the image files. For each camera, the processing workflow may produce a transformation matrix defining the camera position relative to the object being imaged, the camera orientation, and the scale of the associated image.

At block 1235, the processing workflow may project the acquired images to the scan model, as schematically illustrated by FIG. 7. In an illustrative example, each image 710A-710M may be projected to scan model 720 using the camera information produced by the operations described herein above with reference to block 230.

At block 1240, the processing workflow may detect certain anatomical features (such as nose, eye, and/or lips) within the acquired images and, using the image mapping information produced by the operations described herein above with reference to block 1235, project the detected anatomical features onto the scan model, as schematically illustrated by FIG. 8. In an illustrative example, the processing workflow may determine positions 810A-810K of certain anatomical features (such as nose, eye, and/or lips) on scan model 820.

At block 1245, the processing workflow may transform the scan model to align with the base polygonal mesh. Transforming the scan model may comprise modifying positions, orientations, and/or sizes of one or more polygonal faces of the scan model. As schematically illustrated by FIG. 9, the processing workflow may transform scan model 910 to adjust the positions and/or orientations of certain anatomical features (such as nose, eyes, and/or lips) in order to minimize the difference in positions, orientations, and/or sizes of corresponding anatomical features in scan model 910 and base polygonal mesh 920.

In certain implementations, the processing workflow may employ a heuristic optimization method (such as iterative closest point and/or simulated annealing) to transform scan model 910 to minimize the differences in curvatures, point positions, and point normal orientations with respect to base polygonal mesh 920. In an illustrative example, the iterative closest point method may be employed to produce the initial approximation of the transformed scan model, which may be used as the starting point for further optimization by the simulated annealing method.

At block 1250, the processing workflow may transform the base polygonal mesh to align it with the scan model. Transforming the base polygonal mesh may comprise modifying positions, orientations, and/or sizes of one or more polygonal faces of the base polygonal mesh. As schematically illustrated by FIG. 10, the processing workflow may transform base polygonal mesh 1510 by adjusting the positions and/or orientations of certain anatomical features (such as nose, eyes, and/or lips) in order to minimize the difference in positions, orientations, and/or sizes of corresponding anatomical features in scan model 1030 and in base polygonal mesh 1510. In certain implementations, the processing workflow may further transform the scan model by smoothing the model geometry (i.e., adjusting the curvatures of certain lines to bring the line curvature within a pre-defined range).

In certain implementations, the processing workflow may employ a heuristic optimization method (such as iterative closest point and/or simulated annealing) to transform base polygonal mesh 1510 to minimize the differences in curvatures, point positions, and point normal orientations with respect to scan model 1030. In an illustrative example, the iterative closest point method may be employed to produce the initial approximation of the transformed scan model, which may be used as the starting point for further optimization by the simulated annealing method.

At block 1255, the processing workflow may further transform the base polygonal mesh, e.g., by blending certain areas of the scan model with corresponding areas of the base polygonal mesh, modifying edge loops, and merging some vertices of the scan model with corresponding vertices of the base polygonal mesh.

Figure 14:
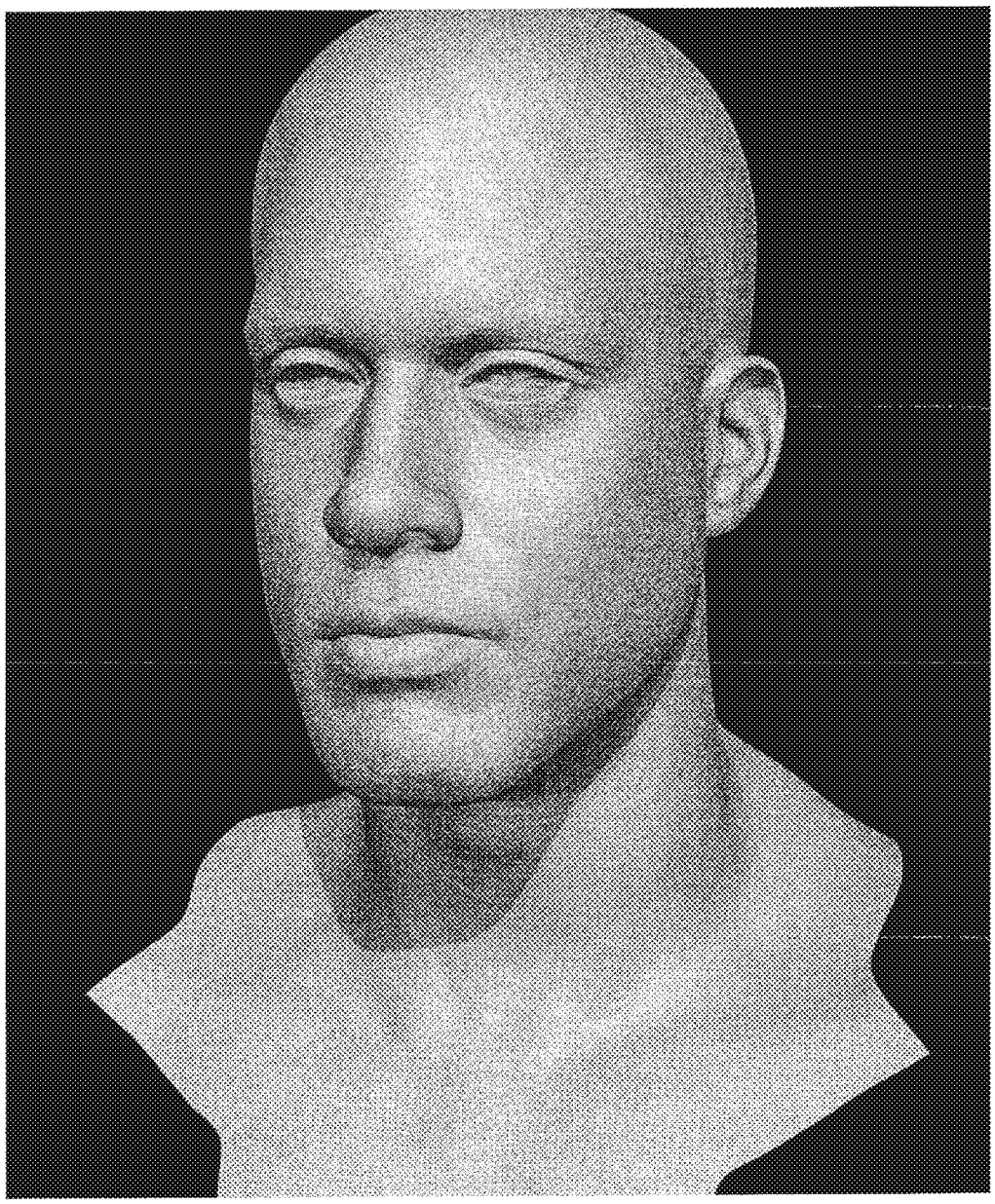
FIG. 14 schematically illustrates producing a scan replacement model by projecting the scan details onto the high-resolution scan model, in accordance with one or more aspects of the present disclosure.

At block 1260, the processing workflow may produce a scan replacement model by projecting the scan details onto the high-resolution scan model 1410, as schematically illustrated by FIG. 14.

At block 1265, the processing workflow may output the scan replacement model, the application-resolution polygonal mesh, the undistorted versions of the original images, and the camera transformation matrices with the associated metadata.

At block 1270, the processing workflow may determine and output the average skin RGB value, the iris RGB value, and the sclera RGB value. The processing workflow may then load a skin tone template, determine the biased average RGB value for each generic albedo/base color skin tone texture layer, and find a closest fit to the sampled biased RGB value of the scan texture by converting all sampled RGB values to XYZ, plotting them in three-dimensional Cartesian coordinate space, and finding the shortest distance between the templates and scan sampled RGB values. The same operations may be performed for the iris color and the sclera color.

At block 1275, the processing workflow may load the application-resolution model and the high-resolution scan replacement model. The processing workflow may iteratively subdivide the application-resolution model and project the details from the scan replacement model, producing an application-topology mesh with several subdivision levels including the scan details, for subsequent editing by the user. The processing workflow may export the highest subdivision level overwriting the scan replacement model.

At block 1280, the processing workflow may generate various textures, such as a light map, shaded color, color, normal, half bent normal, and occlusion textures, for the target application-resolution model and the UV layout, as schematically illustrated by FIG. 11. In an illustrative example, the processing workflow may project the images acquired by a subset of cameras (e.g., front and side cameras 1110A-1110C) onto the base polygonal mesh 1120, and then transform the projected images into the UV space to produce one or more texture maps 1130A-1130M. For every pixel on the surface of the polygonal mesh, the processing workflow may select a corresponding pixel within an image pointed to by a normal vector associated with the pixel. The processing workflow may then export a file storing the base color texture and additional layers to assist the user in creating a game-ready color texture.

In certain implementations, the files produced by the processing workflow, including the polygonal mesh and the textures, may be edited by an artist in order to improve certain visual aspects of these objects.

Figure 15:
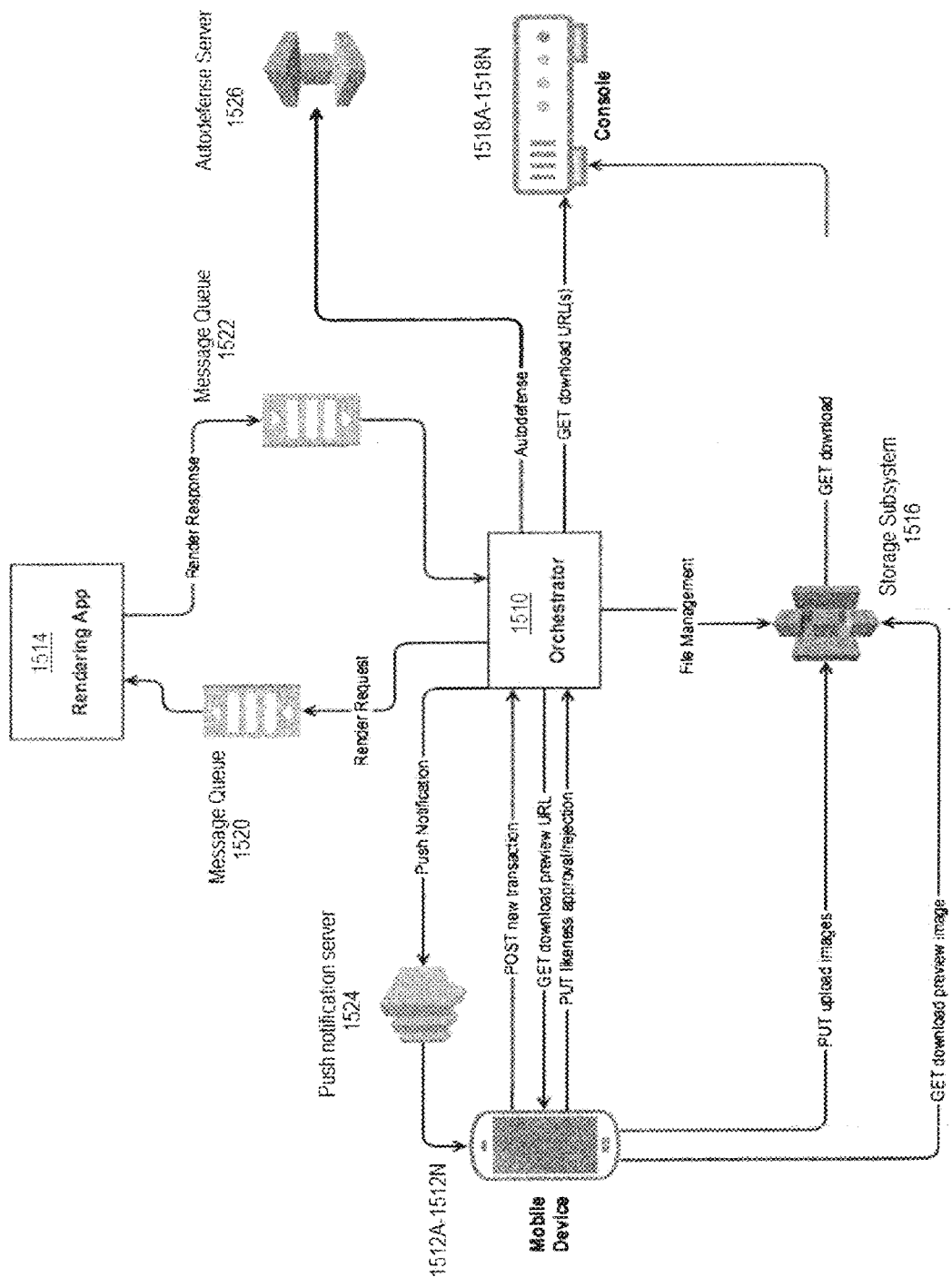
FIG. 15 schematically illustrates an example cloud infrastructure that may be employed for implementing processing workflows for generating three-dimensional visual objects representing a person based on two-dimensional images of at least a part of the person's body, in accordance with one or more aspects of the present disclosure.

In certain implementations, the processing workflows described herein may be executed within a cloud infrastructure, thus allowing efficient processing of images that may be uploaded by multiple concurrent users. FIG. 15 schematically illustrates an example cloud infrastructure that may be employed for implementing processing workflows for generating three-dimensional visual objects representing a person based on two-dimensional images of at least a part of the person's body, in accordance with one or more aspects of the present disclosure. While the illustrative example of FIG. 15 describes the functioning of various components, workflows, and data flows in the context of interactive video gaming, various other use cases that employ the above described systems and methods for generating three-dimensional visual objects representing a person based on two-dimensional images of at least a part of the person's body are within the scope of this disclosure. Certain infrastructure elements, such as load balancers, firewalls, SSL offloaders, routers, switches, are omitted from FIG. 15 for clarity.

In the illustrative example of FIG. 15, an orchestrator component 1510 running on a cloud-based server may be employed to manage the data flows between client devices 1512A-1512N, a rendering application 1514, a storage subsystem 1516, and interactive video gaming consoles 1518A-1518N. Client devices 1512A-1512N may be provided by smartphones, tablet computers, general purpose personal computers, and/or other computing devices equipped with still image cameras. One or more instances of the rendering application 1514 may be executed by one or more application servers. In certain implementations, the orchestrator component 1510 may monitor the number of rendering requests in order to create or decommission instances of the rendering application 1514 based on the current load.

The storage subsystem 1516 may be provided by one or more storage servers implementing file storage, block storage, and/or object storage. Gaming consoles 1518A-1518N may be provided by specialized computing devices equipped with game controls (such as buttons, joysticks, etc.) and/or by general purpose computing devices executing interactive video game applications.

The orchestrator component 1510 may implement various front ends, such as an Hypertext Transfer Protocol (HTTP) server front end, for communicating with the client devices 1512A-1512N and the gaming consoles 1518A-1518N. In the illustrative example of FIG. 15, the orchestrator component 1510 may exchange XML-encoded messages over HTTP protocol with client devices 1512A-1512N in order to manage uploads of the images acquired by a client device 1512A-1512N to the storage subsystem 1516. The orchestrator component 1510 may communicate, via message queues 1520-1522, with one or more instances of the rendering application 1514 in order to initiate processing workflows for producing polygonal meshes, textures, and other artifacts based on the images acquired by the client device 1512. The orchestrator component 1510 may notify client devices 1512A-1512N of completing the rendering workflow by transmitting push notification via a push notification server 1524. The orchestrator component 1510 may exchange XML-encoded messages over HTTP protocol with the gaming consoles 1518A-1518N in order to manage downloading, by the gaming consoles, the target application topology-compliant meshes, textures, and other artifacts that have been produced by the rendering application 1514 based on the images acquired by the client device 1512. In certain implementations, the orchestrator component 1510 may exchange messages with a transaction logging server 1526 in order to prevent denial-of-service (DoS) attacks. In an illustrative example, the orchestrator component 1510 may transmit to the server 1526 logging messages reflecting the Internet Protocol (IP) addresses of the client devices 1512. The server 1526 may keep track of the number of incoming requests by client IP address. Responsive to determining that the number of requests initiated by a client device associated with a certain IP address within a certain period of time exceeds a threshold number of requests, the orchestrator component 1510 may block, for a pre-determined period of time, any further incoming requests from that IP address.

Figure 16:
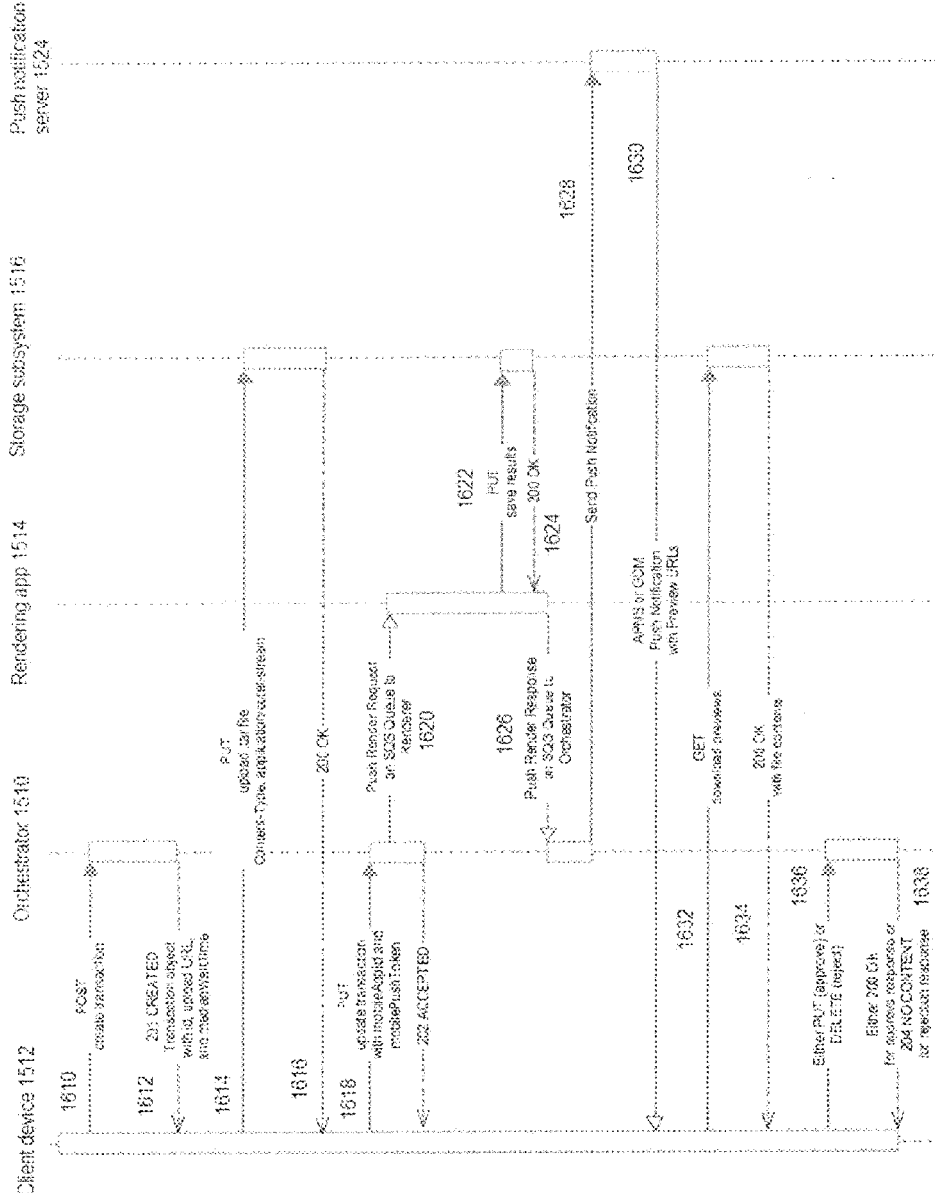
FIG. 16 schematically illustrates an example rendering workflow managed by an orchestrator component within an example cloud infrastructure, in accordance with one or more aspects of the present disclosure.

FIG. 16 schematically illustrates an example rendering workflow managed by an orchestrator component within the example cloud infrastructure of FIG. 15. In the illustrative example of FIG. 16, a user of an interactive video game may employ a video camera-equipped client device 1512 to acquire a series of images showing his or her head from various positions. In certain implementations, the client device 1512 may be programmed to acquire a series of images with a certain frequency while the stationary camera is focused on the user's head, which the user is instructed to slowly rotate.

The client device 1512 may then initiate a new rendering transaction by transmitting an HTTP POST request 1610 to the orchestrator component 1510. Upon receiving and validating the rendering transaction request, the orchestrator component 1510 may transmit an HTTP response 1612 with the status code of 201 CREATED. The HTTP response 1612 may comprise the transaction identifier and a uniform resource locator (URL) for uploading the images acquired by the mobile device. In certain implementations, the HTTP response 1612 may further comprise the median waiting time for the rendering workflow completion.

Upon receiving the HTTP response 1612, the client device 1512 may upload, to the storage subsystem location identified by the URL, one or more files containing the acquired images. The series of images may be accompanied by the associated metadata such as the camera position relative to the object and/or camera settings, including the ISO number, focal length, aperture, and/or shutter speed. In an illustrative example, multiple image files may be archived as a single .tar file. The storage subsystem 1516 may acknowledge the receipt of the files by an HTTP response 1616 having the status code of 200 OK.

The client device 1512 may notify the orchestrator component 1510 of completing the file upload operation by transmitting an update transaction request 1618 which may be represented by an HTTP PUT request. The update transaction request 1618 may comprise the mobile application identifier and the push token that may be used by the orchestrator component 1510 for notifying the client device 1512 of the rendering workflow completion, as described in more details herein below.

Responsive to receiving the update transaction request 1618, the orchestrator component 1510 may transmit, via the outgoing message queue 1520, a rendering request message 1620 to the rendering application 1514. The rendering request message 1620 may identify the file system location storing the files that have been uploaded by client device.

Responsive to receiving the rendering request message 1620, the rendering application 1514 may process the image and metadata files to produce one or more target application topology-compliant meshes and texture files, as described in more details herein above. Upon completing the image processing operations, the rendering application 1514 may save the resulting mesh and texture files to the storage subsystem 1516 and notify the orchestrator component 1510 by an HTTP response 1624 having the status code of 200 OK.

Upon receiving the notification HTTP response 1624, the orchestrator component 1510 may process the resulting mesh and texture files to produce a preview image for presenting to the user of the client device 1512. In an illustrative example, the preview image may be represented by a two-dimensional image of the target application topology-compliant mesh with one or more textures having been projected onto it. The orchestrator component 1510 may then transmit a message 1628 to the push notification server 1524, thus causing the push notification server 1524 to transmit a push notification 1630 to the client device 1512. The push notification 1630 may comprise a URL identifying the location of the preview image file on the storage subsystem 1516.

Upon receiving the push notification 1630, the client device 1512 may initiate the preview file download by issuing an HTTP GET request 1632 to storage subsystem 1516. The HTTP GET request 1632 may comprise the URL identifying the location of the preview image file on the storage subsystem 1516. Responsive to receiving the HTTP GET request 1632, the storage subsystem 1516 may transmit an HTTP response 1634 comprising the contents of the image preview file and having the status code of 200 OK.

The client device 1512 may display the received image preview file and prompt the user to accept or reject the preview file. The client device 1512 may then transmit, to the orchestrator component 1510, an HTTP request 1636 reflecting the user's approval or rejection of the preview image file. Orchestrator 1510 may acknowledge the received message by transmitting HTTP response 1638 which may have the status code of 200 OK to acknowledge the preview image approval request or the status code of 204 NO CONTENT to acknowledge the preview image rejection request.

Having approved the preview image, the user of client device 1512 may initiate a new interactive video gaming session using a gaming console 1518. The gaming console 1518 may transmit an HTTP GET request to the orchestrator component 1510 requesting a URL for downloading target application topology-compliant mesh and texture files. In an illustrative example, the HTTP GET request may comprise the user identifier and the interactive video gaming application identifier. Upon receiving the HTTP response comprising the requested URL, the gaming console 1518 may download the mesh and texture files for using in the interactive video gaming application.

As noted herein above, the example cloud infrastructure depicted in FIG. 15 may allow for efficient processing of images being uploaded by multiple concurrent users. In certain implementations, the orchestrator component 1510 may cause the cloud infrastructure to create or decommission instances of the rendering application 1514 based on the value of a certain metric reflecting the current transaction load. In an illustrative example, the metric may be provided by the number of rendering requests in the input message queue 1520. Should the number of rendering requests exceed a certain threshold, the orchestrator component 1510 may cause a new instance of the rendering application 1514 to be created, and modify the threshold accordingly, in order to keep below a certain threshold the number of rendering requests per instance of the rendering application 1514.

Figure 17:
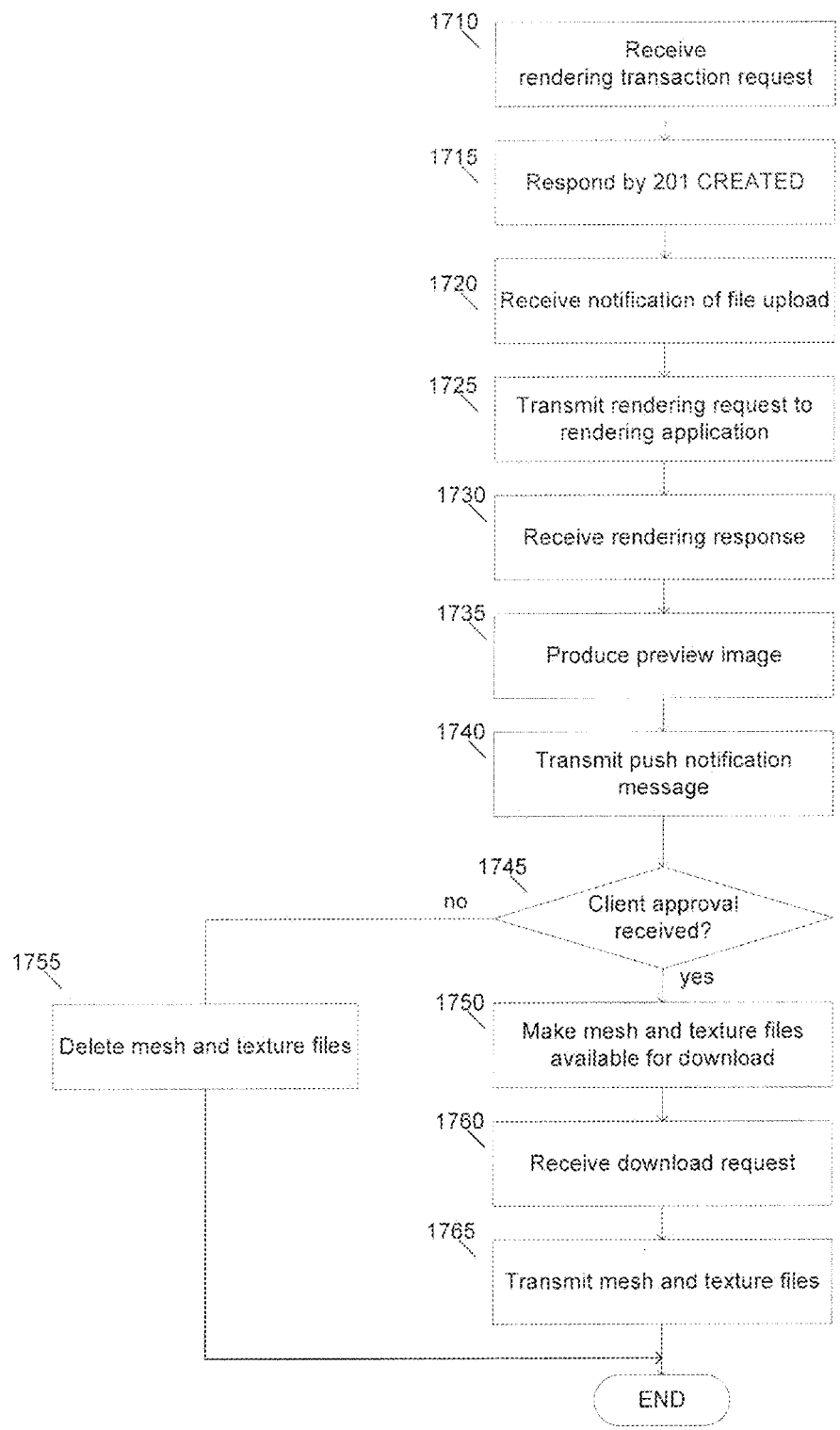
FIG. 17 schematically illustrates a flowchart an example cloud infrastructure-based rendering workflow for generating three-dimensional visual objects representing a person based on two-dimensional images of at least a part of the person's body, in accordance with one or more aspects of the present disclosure.

FIG. 17 schematically illustrates a flowchart an example cloud infrastructure-based rendering workflow for generating three-dimensional visual objects representing a person based on two-dimensional images of at least a part of the person's body, in accordance with one or more aspects of the present disclosure. Processing workflow 1700 may be employed for producing visual objects representing a game character having a visual resemblance with a certain person (e.g., a celebrity).

Processing workflow 1700 and/or each of its individual functions, routines, subroutines, or operations may be performed by one or more general purpose and/or specialized processing devices. In certain implementations, certain operations of processing workflow 1700 may be performed by various elements of the example cloud infrastructure described herein above with references to FIG. 15.

Two or more functions, routines, subroutines, or operations of processing workflow 1700 may be performed in parallel or in an order which may differ from the order described above. In certain implementations, processing workflow 1700 may be implemented by a single processing thread. Alternatively, processing workflow 1700 may be implemented by two or more processing threads, each thread executing one or more individual functions, routines, subroutines, or operations of the method. In an illustrative example, the processing threads implementing processing workflow 1700 may be synchronized (e.g., using semaphores, critical sections, and/or other thread synchronization mechanisms). Alternatively, the processing threads implementing processing workflow 1700 may be executed asynchronously with respect to each other.

At block 1710, a processing device executing the orchestrator component may receive a rendering transaction request initiated by a client device. In certain implementations, the rendering transaction request may be represented by an HTTP POST request, as described in more details herein above.

At block 1715, the processing device may acknowledge the rendering transaction request by transmitting an HTTP response with the status code of 201 CREATED. The HTTP response 1612 may comprise the transaction identifier and a uniform resource locator (URL) for uploading the images acquired by the mobile device, as described in more details herein above.

At block 1720, the processing device may receive, from the client device that has initiated the rendering transaction, a notification indicating that one or more files containing images of at least a part of a human body (e.g., the user's head) have been uploaded to the storage location identified by the URL. The images may be accompanied by a plurality of metadata items, each metadata item of the plurality of metadata items reflecting at least one of: a position of a camera relative to an object being imaged, an orientation of the camera, or a scale an image produced by the camera, as described in more details herein above.

At block 1725, the processing device may transmit, to a rendering application, a rendering request identifying the storage location to which the source image files have been uploaded by the client device, as described in more details herein above.

At block 1730, the processing device may receive, from the rendering application, a response indicating that the rendering application has processed the source image files and produced one or more target application topology-compliant meshes and texture files, as described in more details herein above.

At block 1735, the processing device may process the resulting mesh and texture files to produce a preview image for presenting to the user of the client device. In an illustrative example, the preview image may be represented by a two-dimensional image of the target application topology-compliant mesh with one or more textures having been projected onto it, as described in more details herein above.

At block 1740, the processing device may transmit a message to a push notification server, thus causing the push notification server to transmit a push notification to the client device. The push notification may comprise a URL identifying the location of the preview image file on the storage subsystem, as described in more details herein above.

Responsive to receiving, at block 1745, an approval of the preview image by the client device, the processing device may, at block 1750, make the target application topology-compliant meshes and texture files available for downloading by a gaming console; otherwise, at block 1755, the processing device may delete the meshes and texture files, and the method may terminate.

Responsive to receiving, at block 1760, receiving a download request from an interactive video gaming console, the processing device may, at block 1765, transmit to the interactive video gaming console one or more files comprising the target application topology-compliant meshes and texture, and the method may terminate.

Figure 18:
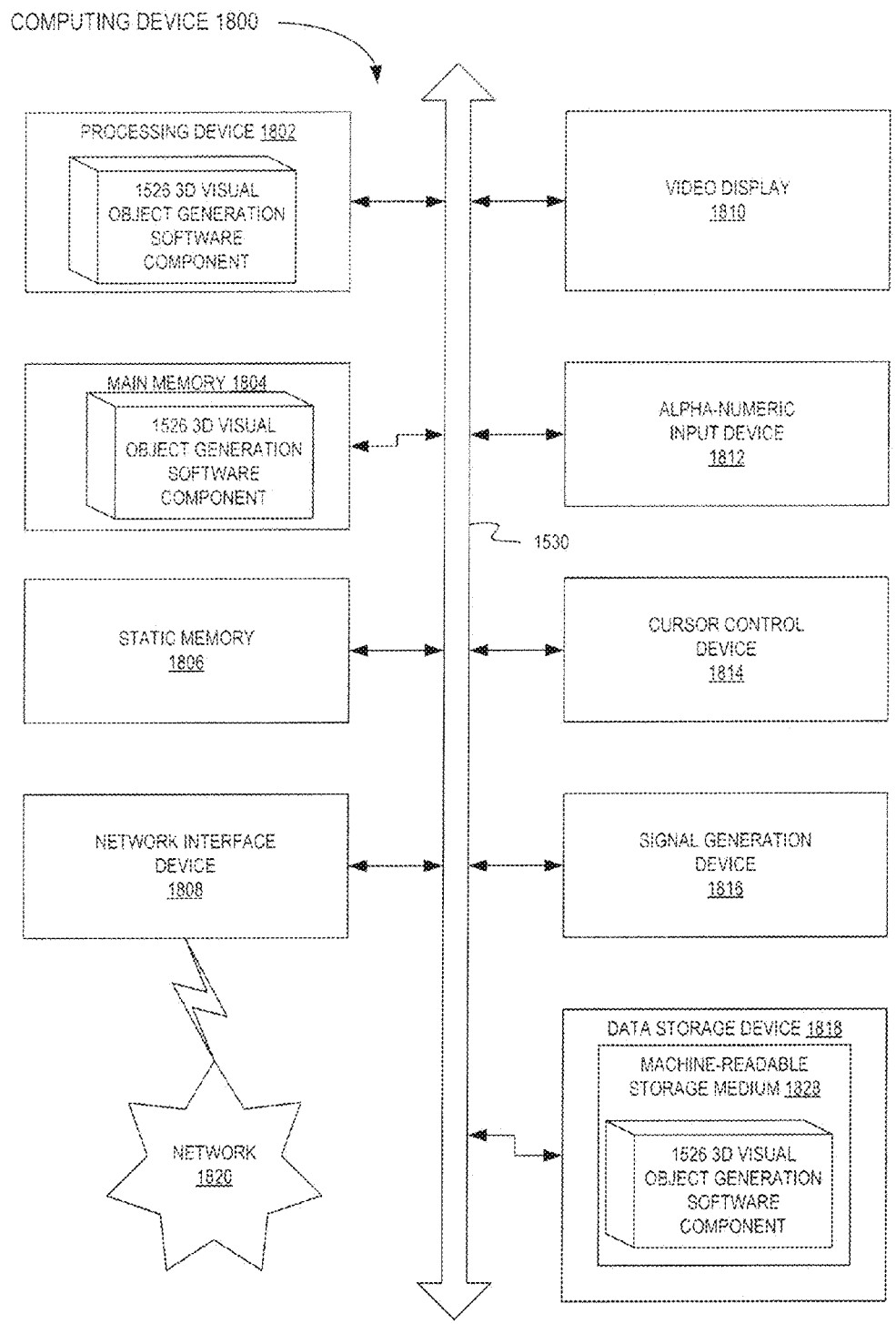
FIG. 18 depicts a block diagram of an illustrative computing device operating in accordance with one or more aspects of the present disclosure.

FIG. 18 illustrates a diagrammatic representation of a computing device 1800 which may implement the systems and methods described herein. Computing device 1800 may be connected to other computing devices in a LAN, an intranet, an extranet, and/or the Internet. The computing device may operate in the capacity of a server machine in client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1800 may include a processing device (e.g., a general purpose processor) 1802, a main memory 1804 (e.g., synchronous dynamic random access memory (DRAM), read-only memory (ROM)), a static memory 1806 (e.g., flash memory and a data storage device 1818), which may communicate with each other via a bus 1830.

Processing device 1802 may be provided by one or more general-purpose processing devices such as a microprocessor, central processing unit, or the like. In an illustrative example, processing device 1802 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1802 may also comprise one or more special-purpose processing devices such as an application specific integrated circuit (ASIC), a field programmable gate array (FPGA), a digital signal processor (DSP), network processor, or the like. The processing device 1802 may be configured to execute software component 1826 implementing workflows 200 and/or 1200 for generating three-dimensional visual objects representing a person based on two-dimensional images of at least a part of the person's body, in accordance with one or more aspects of the present disclosure, for performing the operations and steps discussed herein.

Computing device 1800 may further include a network interface device 1808 which may communicate with a network 1820. The computing device 1800 also may include a video display unit 1818 (e.g., a liquid crystal display (LCD) or a cathode ray tube (CRT)), an alphanumeric input device 1812 (e.g., a keyboard), a cursor control device 1814 (e.g., a mouse) and an acoustic signal generation device 1816 (e.g., a speaker). In one embodiment, video display unit 1818, alphanumeric input device 1812, and cursor control device 1814 may be combined into a single component or device (e.g., an LCD touch screen).

Data storage device 1818 may include a computer-readable storage medium 1828 on which may be stored one or more sets of instructions, e.g., instructions of software component 1826 implementing workflows 200 and/or 1200 for generating three-dimensional visual objects representing a person based on two-dimensional images of at least a part of the person's body. Instructions implementing software component 1826 may also reside, completely or at least partially, within main memory 1804 and/or within processing device 1802 during execution thereof by computing device 1800, main memory 1804 and processing device 1802 also constituting computer-readable media. The instructions may further be transmitted or received over a network 1820 via network interface device 1808.

While computer-readable storage medium 1828 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method, comprising:
    receiving, by a processing device executing an orchestrator process, a rendering transaction request initiated by a client device;
    transmitting, to the client device, a rendering transaction response identifying a first storage location;
    receiving, from the client device, a notification indicating that a plurality of images depicting an object have been uploaded to the first storage location;
    transmitting, to a rendering application, a rendering request specifying the first storage location;
    receiving, from the rendering application, a rendering response indicating that a polygonal mesh representing the images of the object has been stored at a second storage location;
    producing, in view of the polygonal mesh, a preview image;
    storing the preview image at a third storage location; and
    transmitting, to the client device, a notification of completion of the rendering transaction, the notification comprising an identifier of the third storage location.

2. The method of claim 1, wherein the plurality of images are accompanied by a plurality of metadata items, each metadata item of the plurality of metadata items reflecting at least one of: a position of a camera relative to the object, an orientation of the camera, or a scale an image produced by the camera.

3. The method of claim 1, wherein the object is represented by a human body.

4. The method of claim 1, wherein the polygonal mesh is compliant with a target application topology.

5. The method of claim 1, further comprising:
    responsive to receiving an image approval from the client device, making a file comprising the polygonal available for download by an interactive video gaming console.

6. The method of claim 1, further comprising:
    responsive to receiving an image rejection from the client device, deleting a file comprising the polygonal mesh.

7. The method of claim 1, further comprising:
receiving a download request from an interactive video gaming console;
transmitting a file comprising the polygonal mesh to the interactive video gaming console.

8. The method of claim 7, further comprising:
transmitting, to the interactive video gaming console, a texture comprising a mapping a plurality of image pixels to a surface defined by the polygonal mesh.

9. The method of claim 1, wherein the client device is provided by a mobile computing device.

10. The method of claim 1, wherein the mobile computing device is equipped with a still image camera.

11. The method of claim 1, wherein transmitting the rendering request to the rendering application further comprises:
placing the rendering request into an outgoing message queue.

12. The method of claim 1, wherein receiving the rendering response from the rendering application further comprises:
retrieving the rendering response from an incoming message queue.

13. The method of claim 1, further comprising:
monitoring a value of a metric reflecting a number of rendering requests to be serviced by the rendering application; and
responsive to determining that the value exceeds a certain threshold, causing creation of an additional instance of the rendering application.

14. The method of claim 1, wherein notifying the client device of completion of the rendering transaction further comprises:
causing a push notification server to transmit a push notification message to the client device.

15. A computer-readable non-transitory storage medium comprising executable instructions to cause a processing device to:
receive, by the processing device, a rendering transaction request initiated by a client device;
transmit, to the client device, a rendering transaction response identifying a first storage location;
receive, from the client device, a notification indicating that a plurality of images of a person have been uploaded to the first storage location;
transmit, to a rendering application, a rendering request specifying the first storage location;
receive, from the rendering application, a rendering response indicating that a polygonal mesh representing the images of the person has been stored at a second storage location; and
notify the client device of completion of the rendering transaction.

* * * * *